US008023254B2

(12) United States Patent
Zhou

(10) Patent No.: US 8,023,254 B2
(45) Date of Patent: Sep. 20, 2011

(54) ELECTRONIC DEVICE WITH DETACHABLE KEYBOARD

(75) Inventor: Jian Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 95 days.

(21) Appl. No.: 12/508,988

(22) Filed: Jul. 24, 2009

(65) Prior Publication Data

US 2010/0277858 A1 Nov. 4, 2010

(30) Foreign Application Priority Data

Apr. 30, 2009 (CN) .......................... 2009 1 0302036

(51) Int. Cl.
*H05K 5/03* (2006.01)
(52) U.S. Cl. ......... 361/679.17; 361/679.02; 361/679.01; 248/917

(58) Field of Classification Search ............. 361/679.01, 361/679.55, 679.56, 679.08, 679.09, 679.17; 248/917–924
See application file for complete search history.

(56) References Cited

U.S. PATENT DOCUMENTS

| 5,404,271 | A  | * | 4/1995 | Satou et al. | 361/679.32 |
| 7,643,278 | B2 | * | 1/2010 | Hou | 361/679.17 |
| 2003/0021082 | A1 | * | 1/2003 | Lu et al. | 361/683 |
| 2003/0021086 | A1 | * | 1/2003 | Landry et al. | 361/683 |
| 2004/0160738 | A1 | * | 8/2004 | Chen et al. | 361/683 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device includes a main body, a cover, and a keyboard. The main body includes a receptacle having an opening. The cover is coupled to the main body. The keyboard is positioned in the receptacle of the main body. The keyboard is slidable in the receptacle and is detachable from the main body via the opening.

11 Claims, 4 Drawing Sheets

ELECTRONIC DEVICE WITH DETACHABLE KEYBOARD

BACKGROUND

1. Technical Field

The present disclosure relates generally to electronic devices and, more particularly, to an electronic device with a detachable keyboard.

2. Description of Related Art

Notebook computers have become popular alternatives to desktop computers because of their portability. A typical notebook computer includes a display body and a main body. The display body is rotatably attached to the main body so that the display body can be opened and closed relative to the main body. The main body has a housing, a keyboard module, and a circuit board. The circuit board is disposed in the housing. The keyboard module is generally fixed to the housing.

However, if the keyboard of the typical notebook computer malfunctions and needs to be repaired or replaced, disassembling and removing the keyboard module from the housing is difficult because the keyboard module is fixed to the housing. In addition, the circuit board and electrical components may be damaged.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
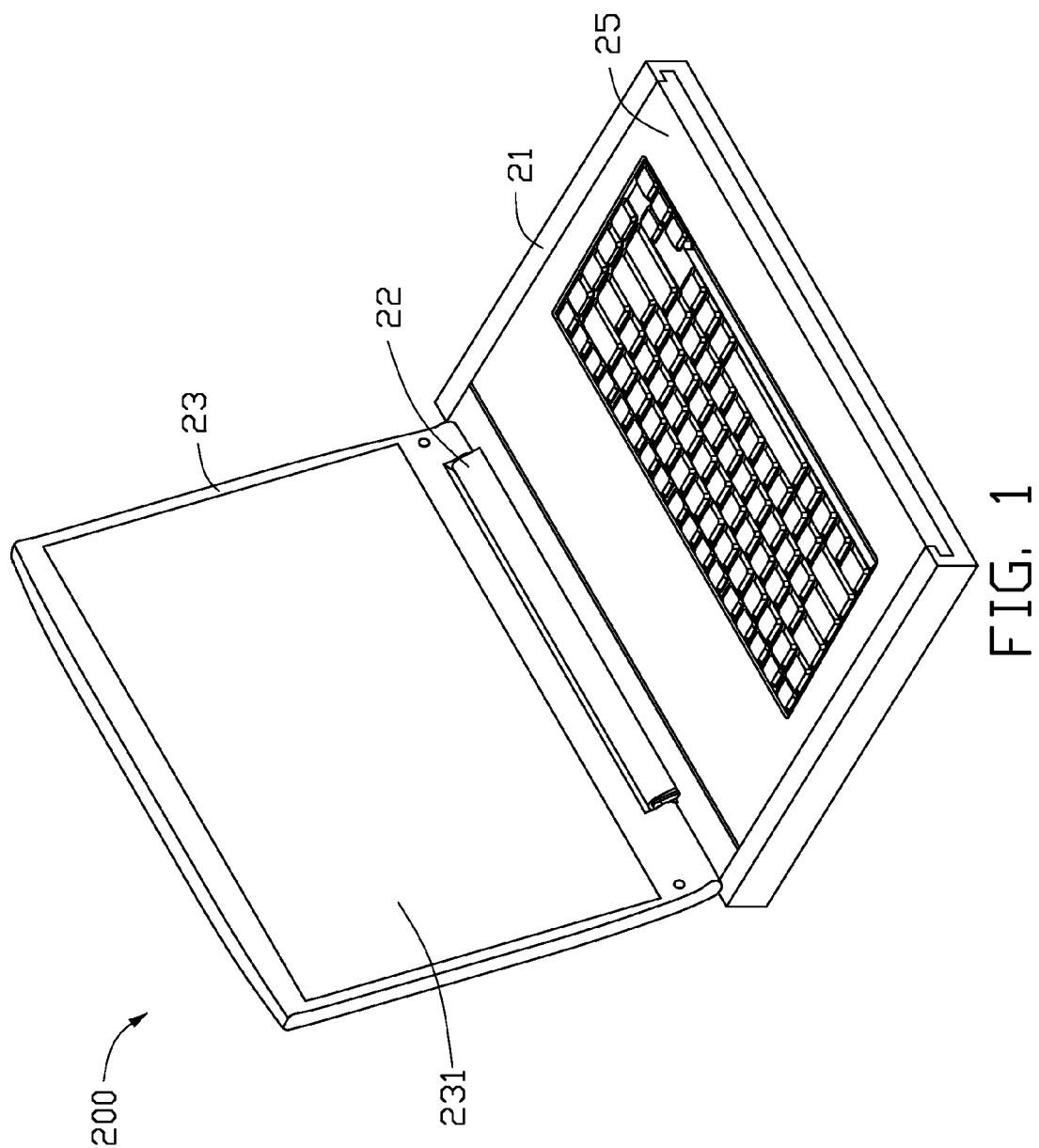
FIG. 1 is an assembled, perspective view of a first exemplary embodiment of an electronic device.

Referring to FIG. 1, an exemplary embodiment of an electronic device 200 includes a main body 21, a hinge 22, a cover 23, and a keyboard 25. In the illustrated exemplary embodiment, the electronic device 200 is a notebook computer, but may alternatively be a PDA (personal digital assistant), mobile phone, or other device. The hinge 22 pivotally connects the cover 23 to the main body 21. The cover 23 includes a display screen 231.

Figure 2:
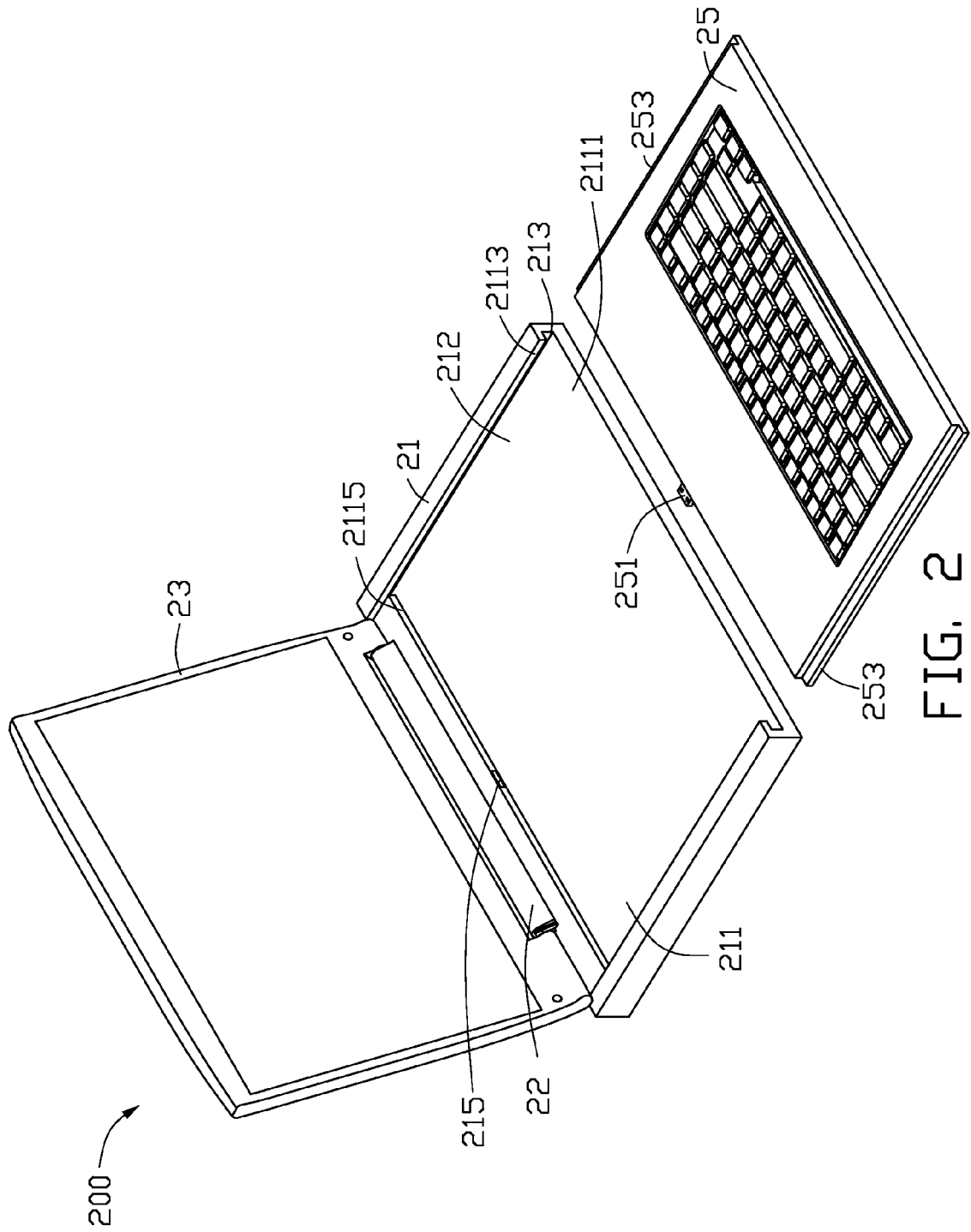
FIG. 2 is an exploded, perspective view of the electronic device of FIG. 1.

Referring to FIG. 2, the main body 21 defines a receptacle 211. The receptacle 211 is configured to receive the keyboard 25. The main body 21 forms two opposite first sidewalls 2113 and a second sidewall 2115 connected to ends of the first sidewalls 2113. The first sidewalls 2113 and the second sidewall 2115 are formed at edges of the receptacle 211. The receptacle 211 includes an opening 2111 facing the second sidewall 2115. In the illustrated exemplary embodiment, the main body 21 is rectangular, but may be other shapes. The receptacle 211 has a bottom surface 212 and each of the first sidewalls 2113 defines a sliding slot 213. The second sidewall 2115 defines a socket 215. Electronic components (not shown) such as a main board, circuits, and a hard disk are positioned inside the main body 21 and below the bottom surface 212.

The keyboard 25 is substantially rectangular in the illustrated exemplary embodiment. The keyboard 25 has a plug 251 formed on an edge of thereof. The plug 251 is configured to engage with the socket 215 of the main body 21, to electrically connect the keyboard 25 to the main body 21, so that data may be transmitted between the keyboard 25 and the main body 21. The keyboard 25 further includes two guide rails 253 formed at opposite edges thereof. The guide rails 253 are slidably engaged in the sliding slots 213 to slidably mount the keyboard 25 to the main body 21.

To remove the keyboard 25, the keyboard 25 is pulled to disengage the plug 251 from the socket 215 and allow the keyboard 25 to be slid outwards along the sliding slots 213. The keyboard 25 is slid until the whole keyboard 25 slides out of the receptacle 211 of the main body 21 via the opening 2111 and thus detached from the main body 21. Then the keyboard 25 may be repaired, serviced, or replaced. To install the keyboard 25, it is inserted into the receptacle 211 via the opening 2111. The keyboard 25 is slid into the main body 21 until the plug 251 engages in the socket 215. As such, the keyboard 25 is easily removed and installed. In addition, since the electronic components are disposed inside the main body 21, the electronic components are not exposed and thus not easily damaged during changing the keyboard 25 and are protected from pollutants such as dust.

When the keyboard 25 is engaged in the receptacle 211 of the main body 21, the keyboard 25 is kept in place in the main body 21 by friction therebetween. To make the keyboard 25 positioned more firmly, the bottom surface 212 and a surface facing the bottom surface 212 of the keyboard 25 may be roughened to increase the friction therebetween.

Figure 3:
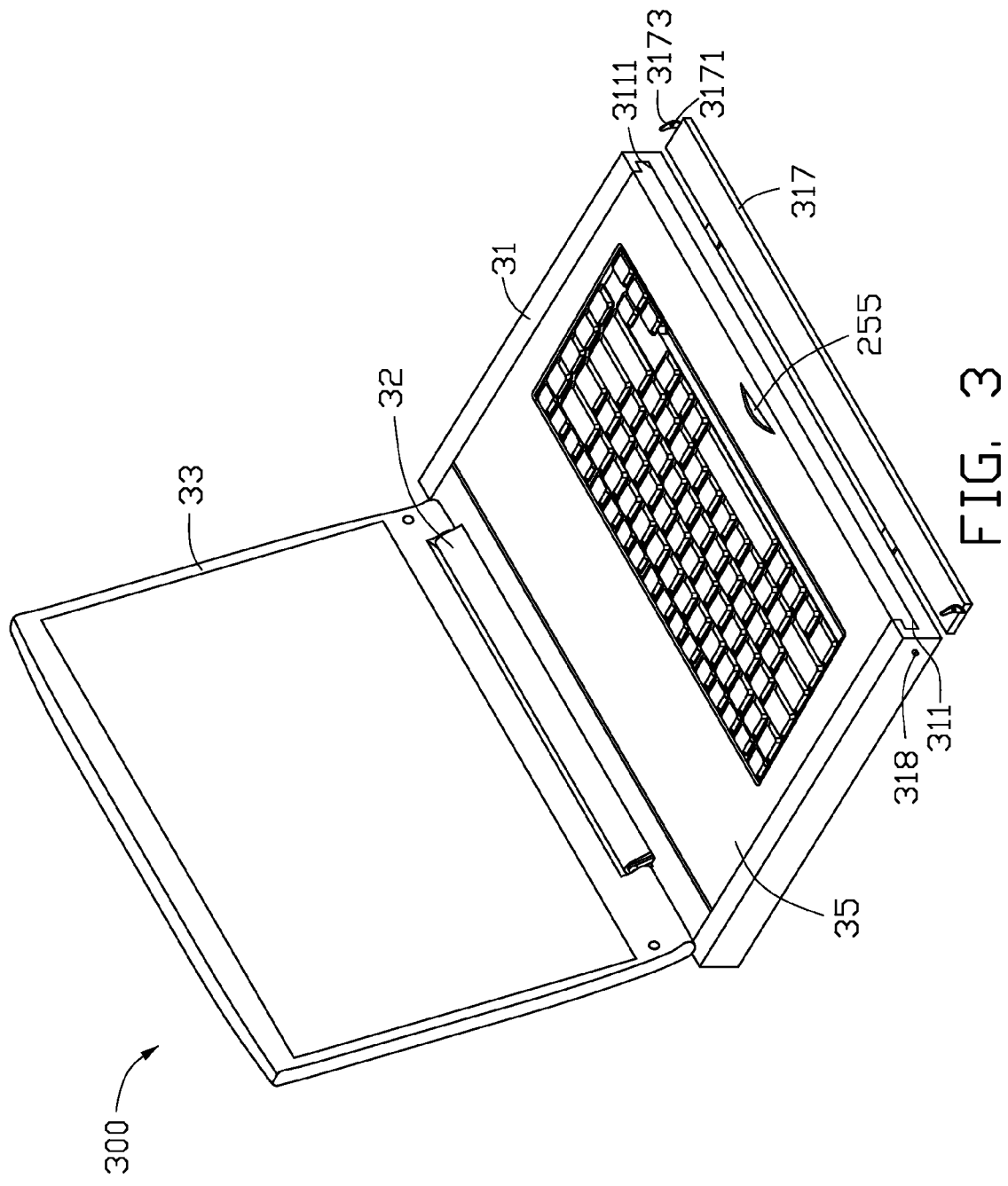
FIG. 3 is an assembled, perspective view of a second exemplary embodiment of an electronic device.

Referring to FIG. 3, a second exemplary embodiment of an electronic device 300 is similar to the electronic device 200, except that the electronic device 300 further includes a pulling portion 255 and a covering plate 317. The electronic device 300 includes a main body 31, a hinge 32, a cover 33, and a keyboard 35. The hinge 32 is to pivotally connect the cover 33 to the main body 31. The main body 31 includes a receptacle 311 and the receptacle 311 includes an opening 3111. The pulling portion 255 is formed on a top surface of the keyboard 35 to facilitate pulling the keyboard 35 to slide out of the main body 31. In the illustrated exemplary embodiment, the pulling portion 255 is a groove. The covering plate 317 includes two pivot pieces 3171 at opposite ends thereof correspondingly. Each pivot piece 3171 defines a pivot hole 3173. The main body 31 forms a pivot pole 318 adjacent to each end of the opening 3111. The pivot poles 318 are rotatably engaged in the pivot holes of the covering plate 317 to rotatably connect the covering plate 317 to the main body 31. Thus, the opening 3111 is covered by the covering plate 317 to prevent the keyboard 35 from falling off the main body 31 via the opening 3111.

Figure 4:
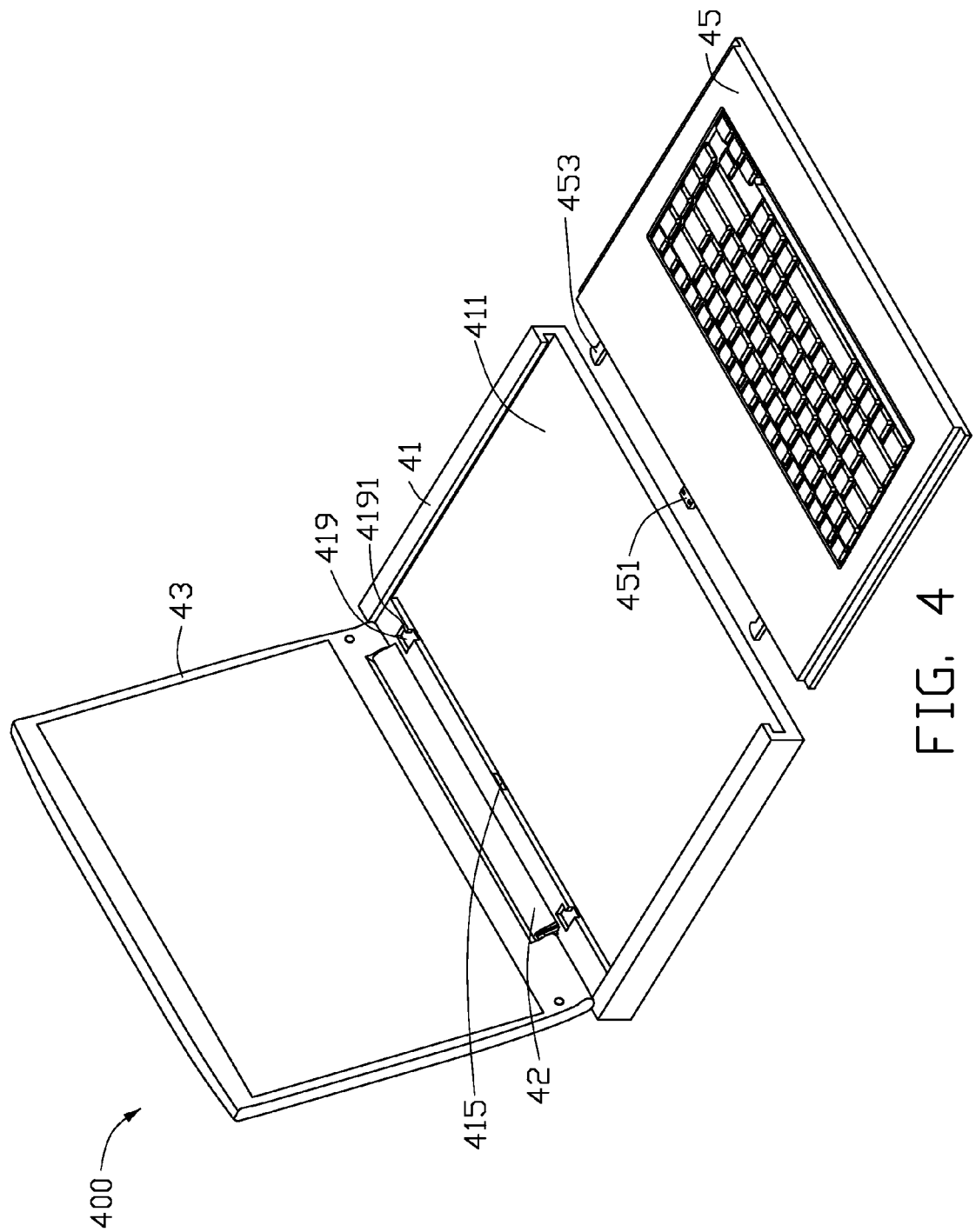
FIG. 4 is an exploded, perspective view of a third exemplary embodiment of an electronic device.

Referring to FIG. 4, a third exemplary embodiment of an electronic device 400 is similar to the electronic device 200. The electronic device 400 includes a main body 41, a hinge 42, a cover 43, and a keyboard 45. The main body 41 has a receptacle 411 to receive the keyboard 45. The keyboard 45 includes a plug 451 at one edge thereof to engage in a socket 415 of the main body 41. The main body 41 further defines two latching slots 419 and two catches 4191 adjacent to the latching slots 419 correspondingly. The keyboard 45 forms two latches 453 at the same edge where the plug 451 is located. The latches 453 are received in the latching slots 419 to engage with the catches 4191, thus preventing the keyboard 45 from falling off the main body 41. To detach the keyboard 45 from the main body 41, the latches 453 are deformed to disengage from the catches 4191.

In alternative exemplary embodiments, the guide rails 253 may be formed on the main body 21 and the sliding slots 213 may be defined in the keyboard 25 accordingly. The cover 23 may be connected to the main body 21 in other manners, for example, the cover 23 may be slidably connected to the main body 21, but not rotatably connected to the main body 21.

Finally, while various exemplary embodiments have been described and illustrated, the disclosure is not to be construed as being limited thereto. Various modifications can be made to the exemplary embodiments by those skilled in the art without departing from the true spirit and scope of the disclosure as defined by the appended claims.

What is claimed is:

1. An electronic device, comprising:
a main body comprising a receptacle, the receptacle comprising an opening;
a cover coupled to the main body;
a keyboard to positioned in the receptacle of the main body; and
a covering plate to cover the opening of the main body, the covering plate comprising two pivot pieces at opposite ends thereof correspondingly, each pivot piece defining a pivot hole; the main body forming a pivot pole adjacent to each end of the opening; the pivot poles rotatably engaged in the pivot holes of the covering plate to rotatably connect the covering plate to the main body;
wherein one of the main body and the keyboard forms a guide rail, the other of the main body and keyboard defines a sliding slot; the guiding rail is slidably engaged within the sliding slot so that the keyboard is slidably retained in the receptacle of the main body.

2. The electronic device of claim 1, wherein one of the main body and the keyboard forms a socket, the other of the main body and keyboard forms a plug to electrically engage with the socket.

3. The electronic device of claim 1, wherein the keyboard forms a pulling portion to facilitate pulling the keyboard to slide out of the main body.

4. The electronic device of claim 1, wherein the main body further defines a latching slots and a catch adjacent to the latching slots correspondingly; the keyboard forms a latch at an edge of thereof; the latch is received in the latching slot to engage with the catch, thus prevent the keyboard from falling off the main body.

5. The electronic device of claim 4, wherein the latch is deformable to disengage from the catch.

6. The electronic device of claim 1, wherein the cover is pivotally connected to the main body.

7. An electronic device, comprising:
a main body comprising a receptacle and forming one of a socket or a plug;
a keyboard detachably positioned in the main body, the keyboard forming the other of a plug or a socket, wherein when keyboard is positioned in the receptacle, the plug is electrically engaged with the socket, and when the keyboard is detached form the main body, the plug is disengaged from the socket; one of the main body and the keyboard forms a guide rail, the other of the main body and keyboard defines a sliding slot; the guiding rail is slidably engaged within the sliding slot so that the keyboard is slidably retained in the receptacle of the main body;
wherein the receptacle of the main body comprises an opening to allow the keyboard to insert therein or removed therefrom the electronic device further comprises a covering plate to cover the opening of the main body; the covering plate comprises two pivot pieces at opposite ends thereof correspondingly, each pivot piece defines a pivot hole; the main body forms a pivot pole adjacent to each end of the opening; the pivot poles are rotatably engaged in the pivot holes of the covering plate to rotatably connect the covering plate to the main body.

8. The electronic device of claim 7, wherein the keyboard forms a pulling portion to facilitate pulling the keyboard to slide out of the main body.

9. The electronic device of claim 7, wherein the main body further defines a latching slots and a catch adjacent to the latching slots correspondingly; the keyboard forms a latch at an edge of thereof; the latch is received in the latching slot to engage with the catch, thus prevent the keyboard from falling off the main body.

10. The electronic device of claim 9, wherein the latch is deformable to disengage from the catch.

11. An electronic device, comprising:
a main body comprising a receptacle;
a keyboard to positioned in the receptacle, wherein one of the main body and the keyboard forms a guide rail, the other of the main body and keyboard defines a sliding slot; the guiding rail is slidably engaged within the sliding slot so that the keyboard is slidably retained in the receptacle of the main body; and
a covering plate, the receptacle comprising an opening covered by the cover plate;
wherein one of the main body and the keyboard forms a socket, the other of the main body and the keyboard forms a plug to electrically engage with the socket; the covering plate comprises two pivot pieces at opposite ends thereof correspondingly, each pivot piece defines a pivot hole; the main body forms a pivot pole adjacent to each end of the opening; the pivot poles are rotatably engaged in the pivot holes of the covering plate to rotatably connect the covering plate to the main body.

* * * * *